(No Model.)
G. S. DUNN.
INDIRECT CONTROL OF MOTORS.
No. 549,061.
Patented Oct. 29, 1895.
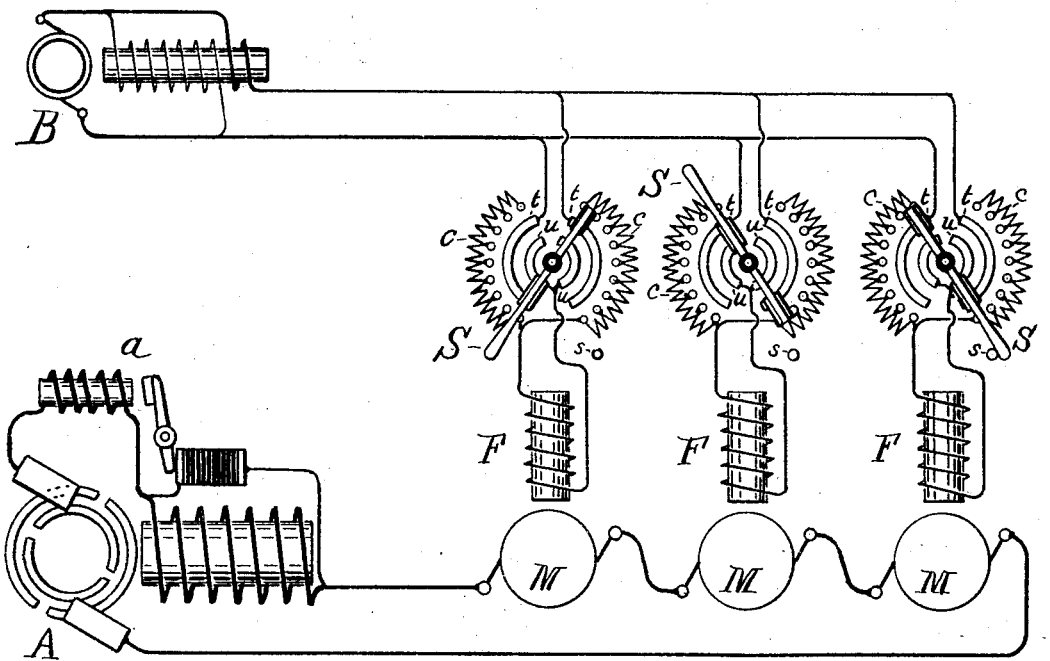
Witnesses:
Samuel W. Balch
H. H. Whitman
Inventor,
Gano S. Dunn.
By Thomas Ewing, Jr.,
Attorney.

UNITED STATES PATENT OFFICE.

GANO S. DUNN, OF NEW YORK, N. Y., ASSIGNOR TO THE CROCKER-WHEELER ELECTRIC COMPANY, OF NEW JERSEY.

INDIRECT CONTROL OF MOTORS.

SPECIFICATION forming part of Letters Patent No. 549,061, dated October 29, 1895.

Application filed August 12, 1895. Serial No. 558,977. (No model.)

*To all whom it may concern:*

Be it known that I, GANO S. DUNN, a citizen of the United States of America, residing in the city, county, and State of New York, have invented certain new and useful Improvements in Methods of and Apparatus for Indirect Control of Motors, of which the following is a specification.

The invention consists, essentially, in putting the armature of the working motor in a constant-current circuit which is independent of the field and providing the field with a regulator, or if there be more than one working motor the invention consists in putting all the armatures of the working motors in series in a constant-current circuit which is entirely independent of the fields and providing each field with a regulator. Thus the motor or motors can be driven with energy derived from a single source, which can be safely of very high potential and supply a very large current, and the motor or motors can be regulated, (and, if desired, reversed,) each, if there be more than one, independently of all the others by controlling the small current necessary to energize the fields. If there be more than one motor, the fields must be independently controllable and may be separately excited; but I prefer to place them in multiple on a constant-potential circuit. In circuit with each field is placed a reversible regulator, whereby the polarity and strength of the field can be controlled.

In the accompanying drawing, which forms a part of this specification, the figure is a diagrammatic view showing three working motors, a constant-current machine to supply the armatures, and a constant-potential machine to supply the field-coils, together with suitable circuits and connections.

I call the circuit which includes the constant-current machine A and the working-motor armatures M the "armature-circuit," and call the circuit which includes the constant-potential machine B and the field-coils the "field-circuit."

Without intending to limit myself to any particular style of machines, I have shown for the constant-current generator a series-wound direct-current machine A, having an open-coil armature and provided with a shunt around the field-coil, in which is shown an automatic regulator $a$. If for any reason the resistance of the circuit is altered, the solenoid in the main circuit varies the pressure on the column of hard-carbon plates in a shunt around the field-coil. Thus the resistance of the shunt-circuit is varied and with it the electromotive force generated. With proper adjustments the current can be kept constant with varying resistance in the working circuit. With the system herein shown considerable variation in the current is permissible. The constant-potential generator B is, as shown, a machine with two field-coils, one in shunt with the armature and the other in the main circuit in series with the armature. These are adjusted for a constant potential with varying resistance in the circuit.

In series with the field F of each working motor is a reversible regulator, by which the direction and amount of the current in the field can be controlled. As shown, each of these reversible regulators consists of a switch-lever S, co-operating with two series of resistance-coils $c\ c$, which are connected at their terminals to one of the terminals of the field-coil, and two pairs of contact-strips. One of the pairs of contact-strips $u\ u$ is connected to the other terminal of the field-coil, and the two contact-strips $t\ t$ are connected each to one of the main-line wires. The switch-lever has two contact-plates. One of these connects the contact-points of either of the resistance-coils with the adjoining contact-strip $t$, and the other contact-plate connects the other contact-strip $t$ with one of the contact-strips $u$. Through one of these plates one line-wire is connected with one terminal of the field-coil, and through the other plate the other line-wire is connected through one of the series of resistance-coils with the other terminal of the field-coil. By swinging the switch-lever the connections through the contact-plates and contact-strips $t\ u$ are changed and the direction of the current through the field-coil is reversed. A stop $s$ limits the motion of the switch-lever.

It is obvious that instead of connecting each regulator to the same line-wires each may be connected to a separate source of energy. If there is only one motor in the system, the diagram is the same, except that the other two motors are omitted. In this case the terminals of the motor-armature will be connected directly to the generator A.

In operation the sources of energy will supply their respective circuits continuously. When a motor is to stop doing work, its field-circuits will be opened and its armature will be allowed to run free or come to rest. When a motor is to do work, its field-circuit will be closed and the direction of and speed of rotation of the armature will be controlled by the reversible regulator.

I have called this a "system of indirect control," because the speed and direction of the rotation of the motor-armature is controlled indirectly through the field of the motor and without manipulating the current which drives the motor-armature.

Without limiting myself to the precise details shown, what I claim, and desire to secure by Letters Patent of the United States, is—

1. The method of regulating motors which consists in connecting the armature and the field-coils independently of each other, and supplying the armature with a constant current, and regulating the strength of the field, substantially as described.

2. The combination of a motor, means for supplying to the armature a constant current, and means for regulating the field independently of the armature, substantially as described.

3. The combination of two or more motors, an armature circuit in which the armatures of these motors are connected in series, means for supplying to the armature-circuit a constant current, and means for regulating the fields of the motors independently of each other and of the armature-circuit, substantially as described.

4. The combination of a motor, means for supplying the armature a constant current, and means for supplying to the field-coils a constant-potential current, substantially as described.

5. The combination of two or more motors, an armature circuit in which the armatures of the motors are connected in series, means for supplying it with a constant current, a field-circuit in which the field-coils are connected in multiple and means for supplying it with a constant-potential current, substantially as described.

6. The combination of a motor, means for supplying to the armature a constant current, means for supplying to the field-coils a current of constant potential, and a reversible regulator in circuit with the field-coils, substantially as described.

7. The combination of two or more motors, an armature circuit in which the armatures of the motors are connected in series, means for supplying it with a constant current, a field-circuit in which the field-coils of the motors are connected in multiple, means for supplying it with a constant-potential current, and a reversible regulator in circuit with each of the field-coils, substantially as described.

Signed by me, in Montclair, New Jersey, this 8th day of August, 1895.

GANO S. DUNN.

Witnesses:
TRABET GIBSON,
D. WALTER GIBSON.